US009015619B2

(12) United States Patent
Sandford

(10) Patent No.: US 9,015,619 B2
(45) Date of Patent: Apr. 21, 2015

(54) POP-UP PANEL FOR MULTIPLE MESSAGES

(75) Inventor: Greg Sandford, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 751 days.

(21) Appl. No.: 12/486,200

(22) Filed: Jun. 17, 2009

(65) Prior Publication Data

US 2010/0325579 A1    Dec. 23, 2010

(51) Int. Cl.
*G06F 3/048* (2013.01)
*G06F 9/44* (2006.01)
*G06F 3/0481* (2013.01)
*G06F 9/50* (2006.01)

(52) U.S. Cl.
CPC ............ *G06F 3/048* (2013.01); *G06F 3/0481* (2013.01); *G06F 9/50* (2013.01); *G06F 9/4443* (2013.01)

(58) Field of Classification Search
USPC ......................................................... 715/808
See application file for complete search history.

(56) References Cited

U.S. PATENT DOCUMENTS

| | | | |
|---|---|---|---|
| 5,412,776 A | | 5/1995 | Bloomfield et al. |
| 5,428,791 A | * | 6/1995 | Andrew et al. ............... 717/121 |
| 5,566,330 A | * | 10/1996 | Sheffield ............................... 1/1 |
| 6,032,122 A | * | 2/2000 | Gertner et al. ................ 715/772 |
| 6,052,525 A | * | 4/2000 | Carlson et al. ................ 717/100 |
| 6,459,440 B1 | | 10/2002 | Monnes et al. |
| 2008/0059505 A1 | * | 3/2008 | Kalia et al. .................... 707/102 |
| 2009/0307666 A1 | * | 12/2009 | Kilian et al. .................. 717/125 |

OTHER PUBLICATIONS

"Java Tutorial" (hereinafter Java) published 2007 available at http://www.dreamincode.net/forums/topic/22739-message-dialogs-in-java/.*

* cited by examiner

*Primary Examiner* — Peiyong Weng
(74) *Attorney, Agent, or Firm* — Miles & Stockbridge PC

(57) ABSTRACT

One embodiment is directed to a system or pop-up panel module for configuring a pop-up panel. The system or module include a controller and/or processor. The controller and/or processor may be configured to receive a plurality of actions requiring a validation, and invoke a call to a model layer to validate at least one of the plurality of actions. Based on a result of the validation, a message corresponding to the at least one of the plurality of actions is retrieved, and the retrieved message is stored in an object. The controller and/or processor may be further configured to provide a pop-up panel that references contents of the object and displays the message stored in the object, and to re-use the object to store a message for each of the plurality of actions requiring validation.

17 Claims, 5 Drawing Sheets

POP-UP PANEL FOR MULTIPLE MESSAGES

FIELD

Embodiments of the invention are generally related to computer systems and, in particular, to an apparatus, system and method for configuring a message provided in a pop-up panel.

BACKGROUND INFORMATION

Computer applications and software products can provide feedback to a user based on the interaction between the user and the application. This feedback may take the form of a message provided to the user. The feedback message may, for example, be presented in a pop-up window. The feedback message may be a warning, error, notification, or any other message which may convey appropriate information to the user.

In order to provide users with a feedback message, computer application developers are typically required to create a specialized pop-up window for each of the various messages to be displayed. As a result, if a user interface or page within an application is associated with a large number of feedback messages, then a large number of pop-up windows must be developed and stored in memory. In many applications, each page or interface may require numerous pop-up window messages that will consume a significant amount of memory and processing time. In addition, the development of a large number of pop-up windows will require a significant amount of coding and testing by the developers and may also require increased software support and maintenance.

SUMMARY

One embodiment is directed to a system or pop-up panel module for configuring a pop-up panel. The system or module include a controller and/or processor. The controller and/or processor may be configured to receive a plurality of actions requiring a validation, and invoke a call to a model layer to validate at least one of the plurality of actions. Based on a result of the validation, a message corresponding to the at least one of the plurality of actions is retrieved, and the retrieved message is stored in an object. The controller and/or processor may be further configured to provide a pop-up panel that references contents of the object and displays the message stored in the object, and to re-use the object to store a message for each of the plurality of actions requiring validation.

BRIEF DESCRIPTION OF THE DRAWINGS

For proper understanding of the invention, reference should be made to the accompanying drawings, wherein.

DETAILED DESCRIPTION

One embodiment is directed to a system for providing a re-usable message object to a user of an application. In certain embodiments, when a user performs an action, the system is configured to check whether the action requires validation. If the action does require validation, the system may invoke a call to a model layer to perform the validation. If the action is valid, then the system may allow the user to proceed without feedback regarding the validation. If, however, the action is invalid, then the system is configured to retrieve a feedback message corresponding to the invalid action. In one embodiment, the system is then configured to set an object with the retrieved message (i.e., the message may be stored in the object). The system may then display a pop-up panel to the user based on the validation. The pop-up panel can include message text that refers to the object storing the retrieved message. In this manner, the object and pop-up panel can be re-used to store and display different messages corresponding to different actions.

Figure 1:
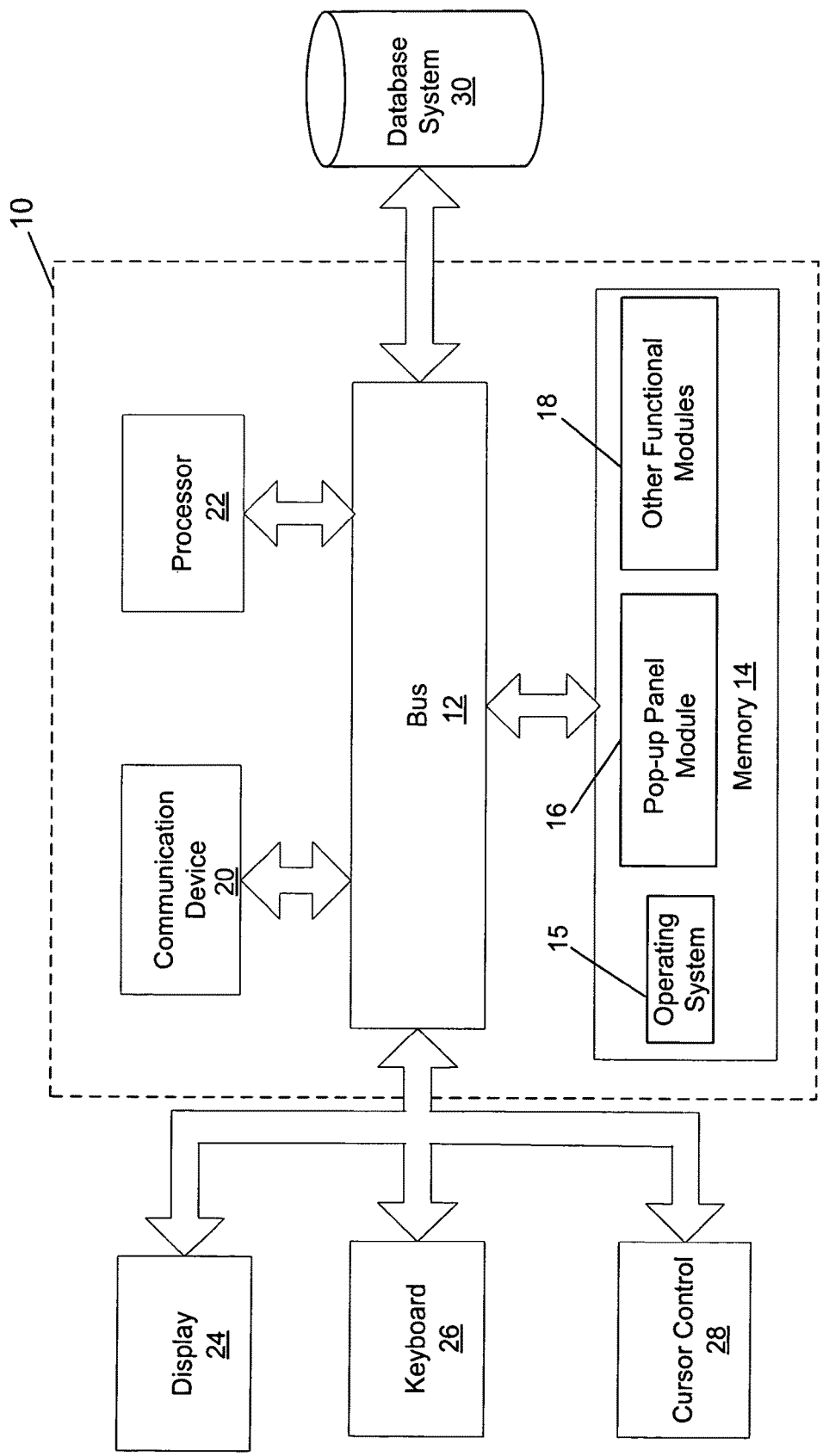
FIG. 1 illustrates a block diagram of a system that may implement an embodiment of the present invention.

FIG. 1 illustrates a block diagram of a system 10 that may implement one embodiment of the invention. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as configuration information. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments.

In one embodiment, memory 14 stores software modules that provide functionality when executed by processor 22. The modules may include an operating system 15 that provides operating system functionality for system 10. The memory may also store pop-up panel module 16, which may be used to configure and provide a generic pop-up window that provides a variety of messages to a user, as discussed in more detail below. In some embodiments, the generic pop-up panel may display an appropriate feedback message by referencing an object which is set with the appropriate feedback message in response to a particular action by a user. Pop-up panel module 16 may also be configured to be a stand alone system or may be part of any other system.

System 10 may also include one or more other functional modules 18 to provide additional functionality. For example, other functional modules 18 may include an Integrated Development Environment ("IDE") or a Compensation Workbench program. An IDE may refer to an application that provides facilities to computer programmers for software development. The IDE may be dedicated to a specific programming language, such as Java, or may be a multiple language IDE. In one embodiment, the IDE is "JDeveloper" from Oracle Corporation.

A Compensation Workbench can allow managers and compensation professionals to plan, allocate, and model budgets and awards globally and across multiple currencies. The Compensation Workbench may also allow users to distribute budgets and compensation based on certain guidelines, in addition to providing a worksheet view of employees, performance ratings, and total compensation. Analytics within the Compensation Workbench may provide internal and external comparisons, statistical analysis, compensation history, and overviews of budgets and allocations to enable managers to make decisions that achieve certain objectives. In one embodiment, the compensation workbench is the "COMPENSATION WORKBENCH" from Oracle Corporation.

Database system 30 may include a database server and any type of database, such as a relational or flat file database. Database system 30 may store data related to the object, the pop-up panel module 16, and/or any data associated with system 10 or its associated modules and components.

In one embodiment, system 10 may operate within a model-view controller ("MVC") framework. MVC may be operable to separate data of an application (the "model") from the user interface (the "view"), so that modifications to the user interface will not affect data handling and so that the data can be reorganized and/or altered without changing the user interface. In other words, MVC decouples data access and business logic from the data presentation and user interaction. In one embodiment, MVC is stored in memory 14. Additionally, MVC may be implemented in hardware alone, or in a combination of hardware and software.

In one embodiment, the model is a domain-specific representation of the information that the application operates. Domain logic adds meaning to raw data which, for example, may be the data stored in database 30. The view renders the model into a form suitable for interaction, such as a user interface. Multiple views can exist for a single mode for different purposes. The controller aspect of MVC processes and responds to events, typically user actions, and may invoke changes on the model. For example, the controller may notify the model of the user actions, possibly resulting in a change in the model's state. A view can use the model indirectly to generate an appropriate user interface. The model and controller need not have direct knowledge of the view.

In one embodiment, system 10 may execute the Java Enterprise Edition ("Java EE") from Sun Microsystems, Inc. as an MVC framework. In this framework, the model is represented by entity beans, and the view is represented by a Java Server Page ("JSP"), which is implemented using JavaServer Faces ("JSF") components. A Java servlet may function as the controller. However, in other embodiments, any MVC framework may be used.

In one embodiment, processor 22 and/or MVC can retrieve a message associated with an action provided by a user from database system 30. Processor 22 or MVC may also control pop-up panel module 16 to retrieve the message associated with the action from the database system 30. Alternatively, processor 22 and/or MVC may directly retrieve the message. The message may be based on the validity of the action provided by the user. In one embodiment, the user may utilize the fields of a graphical user interface to enter various actions. System 10 may then check the validity of the action against certain predefined conditions or thresholds. In certain embodiments, processor 22 and/or the pop-up panel 16 may be configured to perform the validity check. In one example, the validity of the action is checked against certain thresholds stored in database system 30.

If system 10 determines that the action is invalid, processor 22 and/or pop-up panel module 16 may retrieve a feedback message associated with the invalid action from database system 30 or memory 14. In some embodiments, the feedback message may be a warning, error, notification, or any other message which may convey appropriate information to the user. System 10 may then set an object with the retrieved feedback message that is associated with the invalid action. Pop-up panel module 16 is configured to reference the object that includes the appropriate feedback message and to provide the object to display 24 in order to present the feedback message to the user.

In certain embodiments, processor 22, MVC, pop-up panel module 16, and other functional modules 18 may be implemented as separate physical and logical units or may be implemented in a single physical and logical unit. Furthermore, in some embodiments, processor 22, MVC, pop-up panel module 16, and other functional modules 18 may be implemented in hardware, or as any suitable combination of hardware and software.

Figure 2:
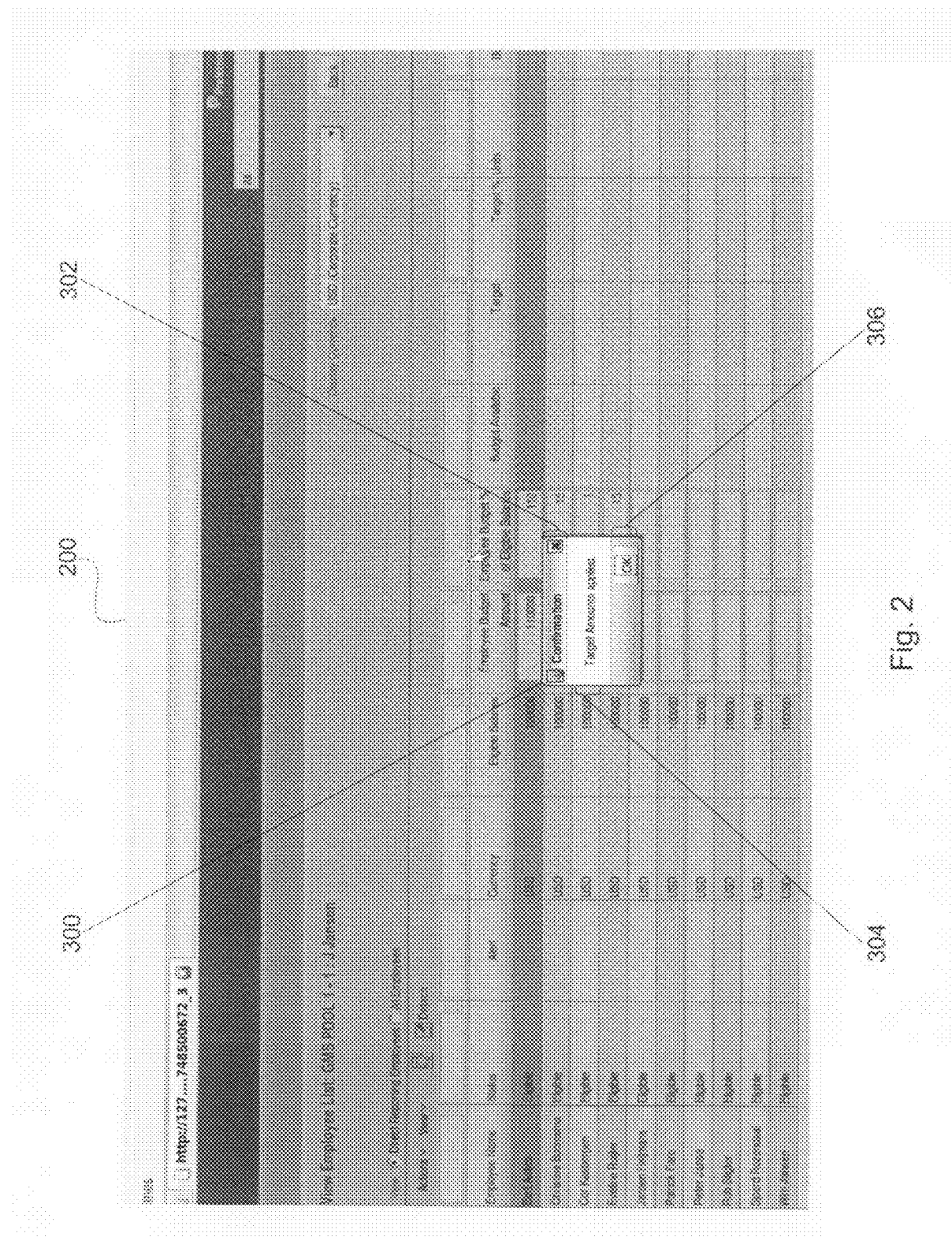
FIG. 2 illustrates a user interface according to one embodiment.

FIG. 2 illustrates an example of an application including a user interface 200 which may be provided by a system according to one embodiment. According to one embodiment, user interface 200 may display a JSP implemented by JSF components in JDeveloper. In response to an action performed on the user interface 200, the system is configured to display a pop-up panel 300 that may provide feedback or any appropriate message to the user based on the current action. In some embodiments, an action may be entering information or text into any of the fields of the user interface 200. In other embodiments, an action may be any interaction performed by the user on the page including those involving the cursor control or keyboard. Additionally or alternatively, pop-up panel 300 may be displayed when an expected action from the user is not received.

Pop-up panel 300 may include a heading section 302, a message section 304, and an option section 306. Heading section 302 may include a title and/or an icon. The title and icon may be customizable to indicate the type of message that is being displayed in pop-up panel 300. Heading section 302 may also include an exit option that allows the user to close pop-up panel 300. Message section 304 may display feedback information that is to be conveyed to the user in response to action received by user interface 200. Option section 306 includes at least one option that the user may select in response to the feedback information.

In the example illustrated in FIG. 2, pop-up panel 300 is displayed to confirm a user's action, as shown by the "Confirmation" heading 302. Option section 306 includes an "OK" button. Upon displaying pop-up panel 300 and the "OK" button being activated, the application is able to confirm the user's action and receive acknowledgment from the user.

Figure 3:
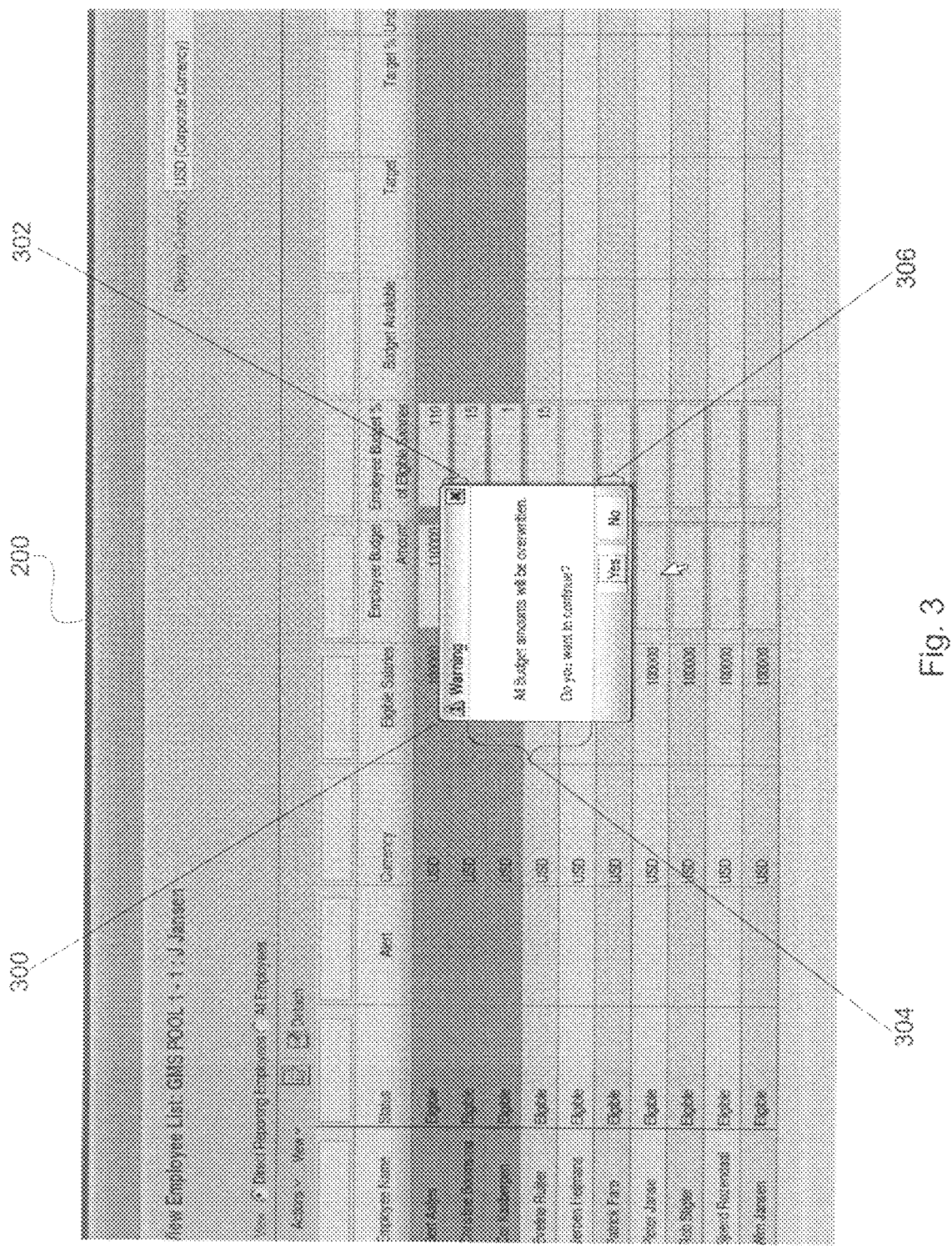
FIG. 3 illustrates a user interface in accordance with one embodiment.

FIG. 3 illustrates another example of user interface 200 which may be provided by a system according to one embodiment. Similar to FIG. 2, FIG. 3 illustrates a pop-up panel 300 that may be displayed to confirm a user's action. In this instance, heading section 302 of FIG. 3 displays a "Warning" message, and message section 304 indicates that "All Budget amounts will be overwritten." In addition, message section 304 asks the user, "Do you want to continue?" and provides "Yes" and "No" buttons in the option section 306.

Although pop-up panel 300 in FIG. 2 and pop-panel 300 in FIG. 3 display different messages that are invoked in different situations (e.g., in response to different actions), both FIGS. 2 and 3 make use of the same, generic pop-up panel. In other words, pop-up panel 300 is invoked in a first instance in FIG. 2, and pop-up panel 300 is re-used when invoked in a second instance in FIG. 3. This is made possible, according to certain embodiments, because pop-up panel 300 refers to an object that is set with an appropriate message in response to each action. Accordingly, a generic pop-up panel and single object can be used to provide feedback messages for all possible actions that may require validation by the system.

Figure 4:
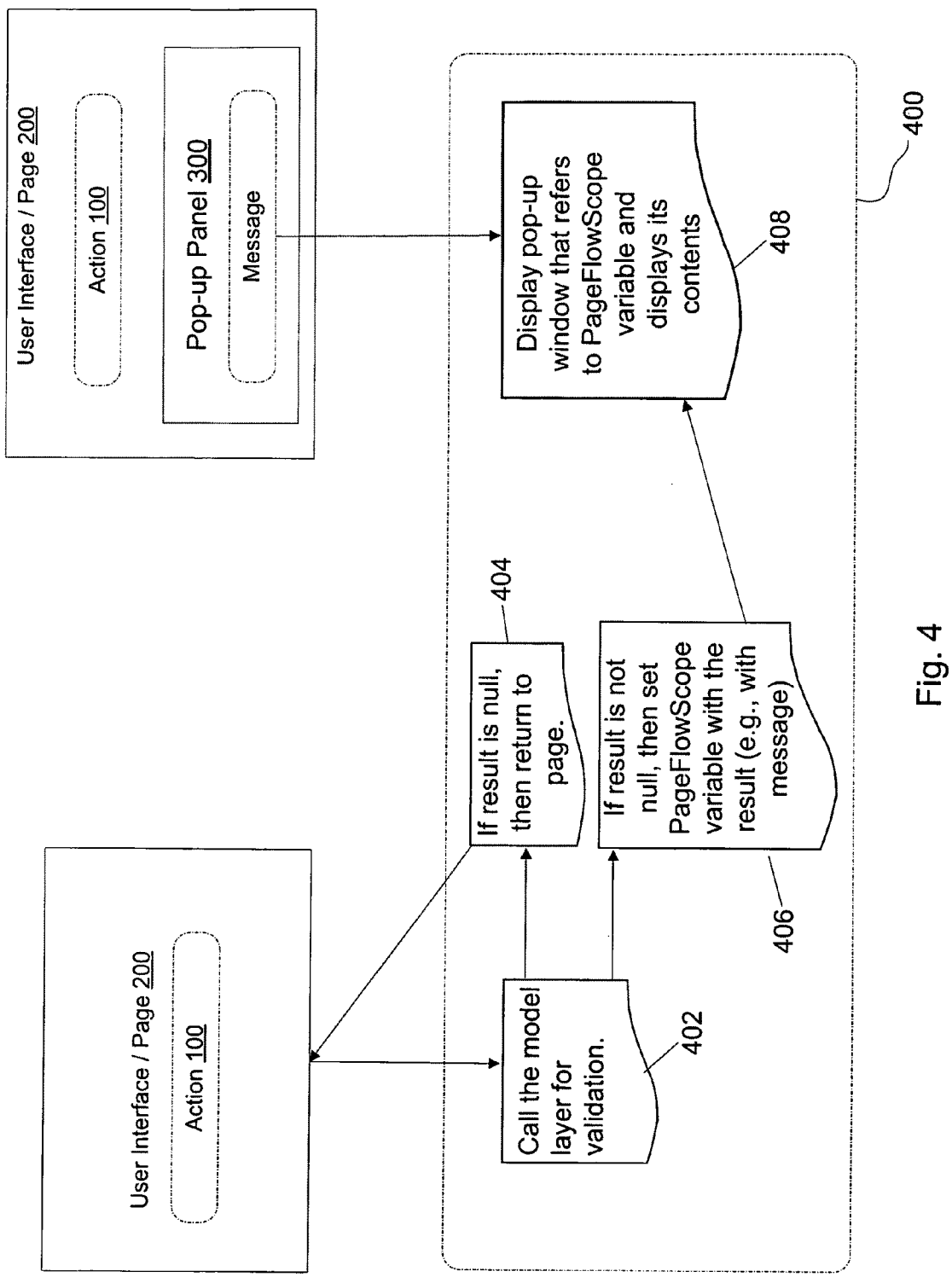
FIG. 4 illustrates a block diagram of a system according to one embodiment.

FIG. 4 illustrates a block diagram of a system 400 for configuring a pop-up display according to one embodiment. In certain embodiments, processor 22 and/or pop-up panel module 16 may be configured to execute the functions illustrated in FIG. 4. In one embodiment, user interface 200 receives an action 100 that requires validation. Depending on whether the action is valid or invalid, system 400 will determine whether pop-up panel 300 is displayed in response to action 100. Upon receipt of action 100, a call is made to the model layer for validation 402 of the action 100. If the model layer determines that the call is valid, it will return a null value. At 404, when the result of the call is a null value, the system will revert to the user interface/page 200 without displaying any message or pop-up panel. If, however, the model layer determines that the action is invalid, then the model layer returns a result or message that corresponds to action 100. In some embodiments, an object, such as a pageFlowScope variable, is set with the result or message corresponding to action 100. The pageFlowScope variable may then be retrievable or accessible to any of the modules of system 10, such as the pop-up panel module 16.

In one embodiment, as mentioned above, the result or message obtained as a result of the validation is passed to a pageFlowScope variable. The pageFlowScope variable may be located in the view layer. In general, a pageFlowScope variable is an object that allows values to pass from one page to another. A value that is added as a pageFlowScope variable continues to be available as a user navigates from one page to another page within an application. In other words, when a message is set to be a value of the pageFlowScope variable, then the message continues to be available as a user navigates from one page to another.

In some embodiments, the model layer may determine the validity of an action 100 by comparing it with certain conditions or thresholds defined for that particular action. The conditions or thresholds may be based on the field or section of the application in which the action is entered. In certain embodiments, the conditions or thresholds may be stored in memory and/or a database. Alternatively, in other embodiments, the conditions or thresholds may be obtained from a separate system. Based on the comparison of the action 100 to the conditions and/or thresholds, the model layer can determine whether the action 100 is valid or invalid.

Once it is determined that the action 100 is invalid and a result or message that corresponds to the invalid action is obtained and stored in an object, such as the pageFlowScope variable, a pop-up panel 300 can be displayed which refers to the object and displays the result or message stored therein 408. The result or message displayed by pop-up panel 300 may indicate why action 100 is invalid or indicate any other appropriate feedback to the user.

Referring again to FIG. 2, in one example, an action may be considered invalid if a user entered a budget amount that exceeded the maximum allowable budget amount. The budget amount may be defined, for instance, by an administrator, Director, chief executive officer (CEO), chief financial officer (CFO), or vice president. In addition, in other embodiments, an action may be considered invalid if a value is entered that is below the minimum allowable budget amount. In some instances, the user may be required to select at least one row (e.g., worker) in the table to apply a budget amount to, and, if the user fails to select a row and then chooses to apply a value, the system will inform them that they need to select at least one row (e.g., worker). These are only some examples of invalid actions, and numerous other invalid actions are possible according to certain embodiments.

Figure 5:
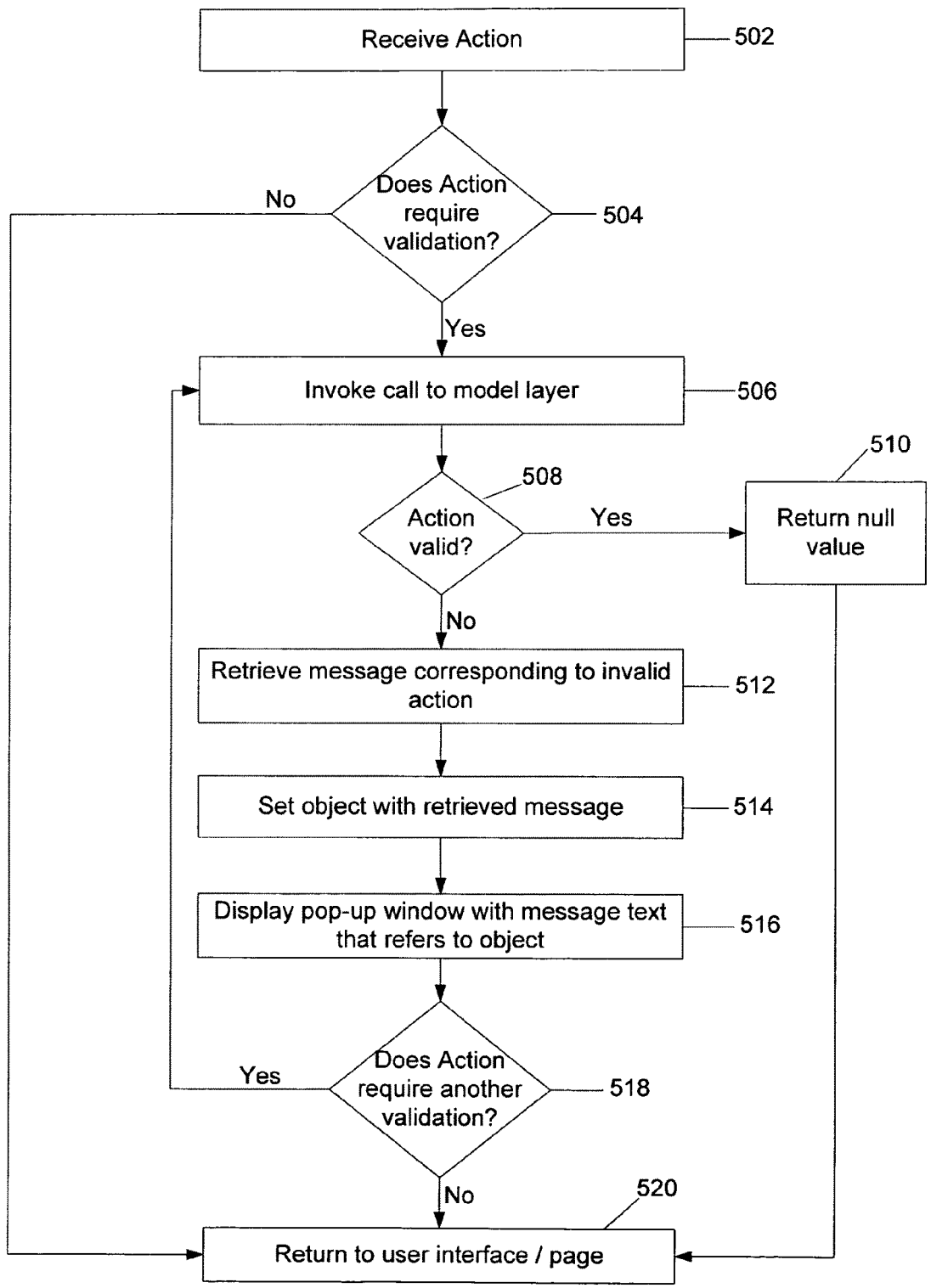
FIG. 5 illustrates a flow diagram of a method in accordance with one embodiment.

FIG. 5 illustrates a process for configuring a pop-up display according to one embodiment. In one embodiment, the functionality of FIG. 5 can be implemented by software stored in memory or other computer readable or tangible media, and executed by a processor. In other embodiments, the functionality can be performed by hardware (e.g., through the use of an application specific integrated circuit "ASIC"), a programmable gate array ("PGA"), a field programmable gate array ("FPGA"), or any combination of hardware and software.

At 502, an action is received by system 10. In one embodiment, the action corresponds to a field of a user interface and/or page. The user interface and/or page may be configured such that each of the fields which require validation are associated with a validation call. Each validation call may employ a validation procedure that is suitable for the field and/or actions that may be associated with that field. In some embodiments, each of the fields corresponds to at least one JSF component of a JSP.

At 504, it is checked whether the received action requires validation. If the action does not require validation, then the process returns to the user interface and/or page at 520 and the current user interface and/or page is not interrupted. If the action does require validation, then a call is invoked to the model layer at 506. At 508, the model layer checks whether the action is valid. If the action is valid, the a null value is returned at 510 as an indication of the validity of the action and the process will return the user interface and/or page. If the action is invalid, then a message that corresponds to the invalid action is retrieved at 512.

Once an appropriate message is obtained, an object is set with the message at 514. As discussed above, in one embodiment, the object may be a pageFlowScope variable. The pageFlowScope variable may be associated with the view layer of the MVC architecture. Subsequently, at 516, a pop-up panel referring to the object and displaying its contents is provided. In addition, each of the required parameters of the message is passed to the generic pop-up panel. Since the message corresponding to the current action is set as the pageFlowScope variable, the pop-up panel is configured to display the message corresponding to the current action.

In some embodiments, the messages are stored in a bundle file, which may be a .xlf file or a text file with extensible markup language (xml) code. Each page may have a bundle file associated with it. In that bundle file, there is a key for each entry. Each entry may also contain a text string or text message. The file can be translated into every language so the end user views the message in their spoken language. Thus, according to certain embodiments, an appropriate message may be retrieved from the bundle that corresponds with the current situation/warning/error that is occurring in the system for a certain action. For example, if the system needs to check whether the budget amount the user entered is between the minimum and maximum, it will access the associated bundle to retrieve the appropriate message when the user has violated the min or max.

Further, in some embodiments, the system will also retrieve a parameter for display with the message. One example of a parameter that may be passed to the message is a maximum budget amount allowed. The system may pass this parameter to the message, such that the message would read, for example, "You have exceeded the Maximum allowable budget amount of $300,000." In this example, the message retrieved from the Bundle file was this "You have exceeded the Maximum allowable budget amount of {parameter}." The parameter passed to the message in this example is $300,000. A parameter may be required because the value can change depending upon other factors, such as the worker name.

In each instance that an action is deemed to be invalid, the same object and pop-up panel are invoked. Additionally, in each instance, the pop-up panel is configured to display the appropriate message, corresponding to the current action, that is provided to the object.

At 518, it is determined whether the action requires another validation. If it does require another validation, then the process returns to 506 to invoke another call to the model layer and proceeds accordingly. If another validation is not required, then the process returns to the user interface and/or page at 520.

As disclosed above, one embodiment is related to a system or method for configuring and/or providing a generic pop-up panel that can handle and display various messages. The pop-up panel may refer to an object which is set with an appropriate feedback message to be displayed. As a result, a generic pop-up panel can be used to display all the feedback messages that could be supplied to a user based on their action. This results in a significant reduction in code because a pop-up window does not need to be configured for each type of feedback message. Instead, certain embodiments allow application developers to rely on the same pop-up panel for displaying a set of messages (e.g., twenty messages) rather than having to configure a set of pop-up windows for each message (e.g., twenty different pop-up windows for each message). A reduction in code typically results in a more stable product, reduced cost, and shortened development cycle time. The product is more stable since there are less objects (e.g., pop-up windows) referenced in the application and, therefore, should result in less bugs or glitches in the application. The product will also require less testing and maintenance than products that provide multiple pop-up windows for multiple messages. In addition, the cost is reduced due to the shortened development time and testing associated with a single pop-up panel for multiple messages system.

One having ordinary skill in the art will readily understand that the functionality of the invention as discussed above may be practiced in a different order, and/or with hardware elements in configurations which are different than those which are disclosed. Embodiments of the invention may be implemented individually or in any appropriate combination. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A non-transitory computer readable medium having instructions stored thereon that, when executed by a processor, cause the processor to configure a pop-up display, the configuring comprising:
   receiving a first user action from a plurality of user actions requiring a validation, the first user action corresponding to a first Java Server Faces (JSF) component of a Java Server Page (JSP);
   invoking a first call to a model layer of a model view controller (MVC) framework to validate the first user action against predefined thresholds;
   based on a result of the validation, retrieving a first message corresponding to the first user action from a bundle file associated with the JSP, the bundle file including a plurality of messages and a plurality of keys, each key corresponding to a different message;
   storing the first message in an object located in a view layer of the MVC framework;
   providing a pop-up panel to display the first message stored in the object to the user, the pop-up panel including a heading section, a message section and an option section, the heading section including at least one of a title, an icon or an exit option, the message section including the first message, the option section including at least one selectable control;
   receiving a second user action from the plurality of user actions requiring validation, the second user action corresponding to a second JSF component of the JSP;
   invoking a second call to the model layer of the MVC framework to validate the second user action;
   based on a result of the validation, retrieving a second message corresponding to the second user action from the bundle file;
   replacing the first message stored in the object with the second message; and
   providing the pop-up panel to display the second message stored in the object to the user, the heading section including the title, icon or exit option, the message section including the second message, the option section including the selectable control.

2. The computer readable medium of claim 1, wherein the object comprises a variable that allows values to pass from one page to another.

3. The computer readable medium of claim 2, wherein the variable comprises a pageFlowScope variable.

4. The computer readable medium of claim 1, wherein the receiving comprises receiving a plurality of actions from a field of a user interface.

5. A computer-implemented method for configuring a pop-up display, the method comprising:
   receiving a first user action from a plurality of user actions requiring a validation, the first user action corresponding to a first Java Server Faces (JSF) component of a Java Server Page (JSP);
   invoking a first call to a model layer of a model view controller (MVC) framework to validate the first user action against predefined thresholds;
   based on a result of the validation, retrieving a first message corresponding to the first user action from a bundle file associated with the JSP, the bundle file including a plurality of messages and a plurality of keys, each key corresponding to a different message;
   storing the first message in an object located in a view layer of the MVC framework; and
   providing a pop-up panel to display the first message stored in the object to the user, the pop-up panel including a heading section, a message section and an option section, the heading section including at least one of a title, an icon or an exit option, the message section including the first message, the option section including at least one selectable control;
receiving a second user action from the plurality of user actions requiring validation, the second user action corresponding to a second JSF component of the JSP;
invoking a second call to the model layer of the MVC framework to validate the second user action;
based on a result of the validation, retrieving a second message corresponding to the second user action from the bundle file;
replacing the first message stored in the object with the second message; and
providing the pop-up panel to display the second message stored in the object to the user, the heading section including the title, icon or exit option, the message section including the second message, the option section including the selectable control.

6. The method of claim 5, wherein the object comprises a variable that allows values to pass from one page to another.

7. The method of claim 6, wherein the variable comprises a pageFlowScope variable.

8. The method of claim 5, wherein the receiving comprises receiving a plurality of actions from a field of user interface.

9. An apparatus, comprising:
a processor; and
a memory comprising a pop-up panel module, wherein the memory and pop-up panel module are configured, with the processor, to cause the apparatus to:
receive a first user action from a plurality of user actions requiring a validation, the first user action corresponding to a first Java Server Faces (JSF) component of a Java Server Page (JSP);
invoke a first call to a model layer of a model view controller (MVC) framework to validate the first user action against predefined thresholds;
based on a result of the validation, retrieve a first message corresponding to the first user action from a bundle file associated with the JSP, the bundle file including a plurality of messages and a plurality of keys, each key corresponding to a different message;
store the first message in an object located in a view layer of the MVC framework;
provide a pop-up panel to display the first message stored in the object to the user, the pop-up panel including a heading section, a message section and an option section, the heading section including at least one of a title, an icon or an exit option, the message section including the first message, the option section including at least one selectable control;
receive a second user action from the plurality of user actions requiring validation, the second user action corresponding to a second JSF component of the JSP;
invoke a second call to the model layer of the MVC framework to validate the second user action;
based on a result of the validation, retrieve a second message corresponding to the second user action from the bundle file;
replace the first message stored in the object with the second message; and
provide the pop-up panel to display the second message stored in the object to the user, the heading section including the title, icon or exit option, the message section including the second message, the option section including the selectable control.

10. The apparatus of claim 9, wherein the object comprises a variable that allows values to pass from one page to another.

11. The apparatus of claim 10, wherein the variable comprises a pageFlowScope variable.

12. The apparatus of claim 9, wherein the apparatus is configured to receive the plurality of actions from a field of user interface.

13. A system, comprising a server including a hardware processor configured to:
receive a first user action and a second user action from a plurality of user actions requiring a validation, the first user action corresponding to a first Java Server Faces (JSF) component of a Java Server Page (JSP), the second user action corresponding to a second JSF component of the JSP;
invoke a first call to a model layer of a model view controller (MVC) framework to validate the first user action against predefined thresholds;
invoke a second call to the model layer of the MVC framework to validate the second user action;
retrieve a first message from a bundle file associated with the JSP, the bundle file including a plurality of messages and a plurality of keys, each key corresponding to a different message, the first message corresponding to the first user action based on a result of the first validation;
retrieve a second message from the bundle file, the second message corresponding to the second user action based on a result of the second validation;
store the first message in an object located in a view layer of the MVC framework;
replace the first message stored in the object with the second message;
provide a pop-up panel to display the first message stored in the object to the user, the pop-up panel including a heading section, a message section and an option section, the heading section including at least one of a title, an icon or an exit option, the message section including the first message, the option section including at least one selectable control, and,
after the first message has been replaced with the second message, provide the pop-up panel to display the second message stored in the object to the user, the heading section including the title, icon or exit option, the message section including the second message, the option section including the selectable control.

14. The computer readable medium of claim 1, wherein the bundle file is an XLIFF (XML Localisation Interchange File Format) file including XML (eXtensible Markup Language) code.

15. The method of claim 5, wherein the bundle file is an XLIFF (XML Localisation Interchange File Format) file including XML (eXtensible Markup Language) code.

16. The apparatus of claim 9, wherein the bundle file is an XLIFF (XML Localisation Interchange File Format) file including XML (eXtensible Markup Language) code.

17. The system of claim 13, wherein the bundle file is an XLIFF (XML Localisation Interchange File Format) file including XML (eXtensible Markup Language) code.

* * * * *